United States Patent [19]

Whiteley

[11] 4,020,372
[45] Apr. 26, 1977

[54] COOLING OF DISCOIDAL DYNAMOELECTRIC MACHINES

[75] Inventor: Eric Whiteley, Peterborough, Canada

[73] Assignee: Canadian General Electric Company Limited, Toronto, Canada

[22] Filed: Sept. 15, 1975

[21] Appl. No.: 613,566

[30] Foreign Application Priority Data

Oct. 9, 1974 Canada .................. 211065

[52] U.S. Cl. ........................ 310/61; 310/268
[51] Int. Cl.² ........................ H02K 9/00
[58] Field of Search ............. 310/52, 54, 55, 57, 310/60, 268, 227, 43, 58, 59, 61, 53

[56] References Cited

UNITED STATES PATENTS

| | | | |
|---|---|---|---|
| 3,277,323 | 10/1966 | Parker | 310/268 |
| 3,428,840 | 2/1969 | Kober | 310/54 |
| 3,445,691 | 5/1969 | Beyersdorf | 310/60 |
| 3,790,835 | 2/1974 | Takeda | 310/268 |
| 3,906,622 | 9/1975 | Sakano | 310/268 |

*Primary Examiner*—R. Skudy
*Attorney, Agent, or Firm*—R. A. Eckersley

[57] ABSTRACT

A rotor for a dynamoelectric machine comprises a discoidal winding of conductors bonded together by means of a resinous material. The structure has a flat disc portion containing the coil sides and outer and inner ring portions containing the coil end-heads and other end connections. Surfaces on the discoidal structure have formations which interrupt areas exposed to the cooling fluid in the machine. This enhances heat transfer from the winding conductors to the fluid.

6 Claims, 9 Drawing Figures

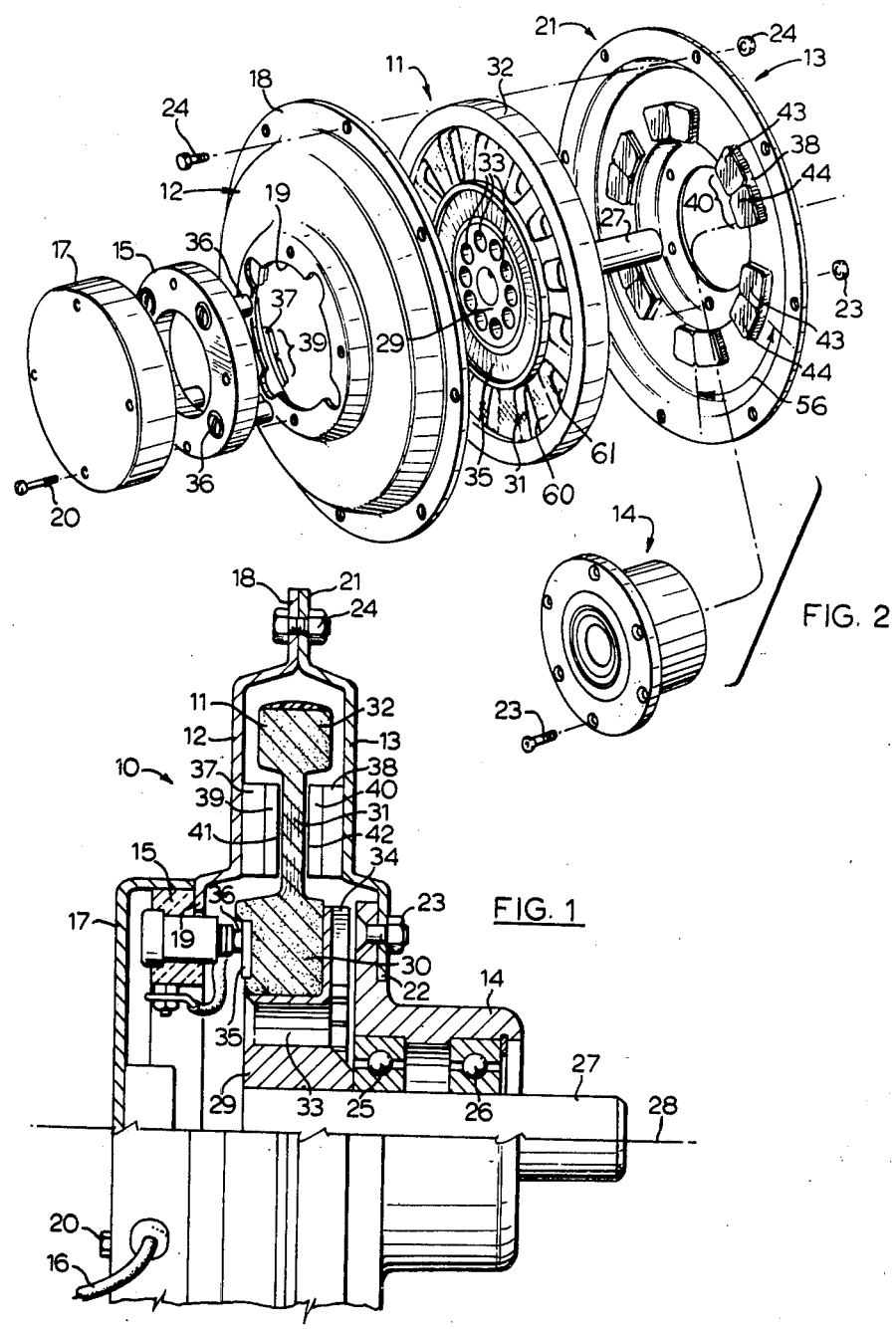

COOLING OF DISCOIDAL DYNAMOELECTRIC MACHINES

This invention relates to means for improving the cooling of discoidal dynamoelectric machines, and in particular to means for improving heat transfer from the rotor to the cooling fluid in the machine.

Discoidal windings of the general character suitable for embodiment of this invention consist essentially of a winding laid out in a flat pattern and having its conductors bonded together by means of a resinous material. The resin bonded winding is a unitary structure in the configuration of an annular disc located between an inner and an outer ring. The disc is a flat and relative thin member which contains the sides of the coils and the rings are usually somewhat thicker because they contain the coil end-heads and connections. Winding of this general character are disclosed in the U.S. application Ser. No. 534,058 filed Dec. 26, 1974, Eric Whiteley.

The object of this invention is to improve the cooling of rotors composed of these types of winding structures.

A discoidal winding structure for an axial gap dynamoelectric machine has a thin annular disc portion containing the coil sides and enlarged ring portions on the inner and outer edges of the disc containing the coil end conductors, all of which portions are coaxial and constitute a unitary structure of winding conductors bonded together with a resinous material. The winding itself consists of a plurality of coils laid in a flat circular pattern overlapping in the lay, each coil having one or more turns. Each coil has its sides disposed radially at approximately one pole pitch, has at least one end-head joining one of the corresponding ends of the sides, and has conductors for connecting the other corresponding ends of the sides to other coils of the winding. To improve cooling of rotors composed of such winding structures, surfaces on the structure are formed with formations that increases the surface area exposed to the cooling fluid in the machine and thereby enchances the transfer of heat from the winding to the fluid.

Embodiments of the invention will now be described in more detail with reference to the accompanying drawings, in which FIG. 1 is a view in elevation of a dynamoelectric machine incorporating a rotor constructed according to the invention;

FIG. 2 is an exploded view in perspective of the machine shown in FIG. 1;

Figure 3:
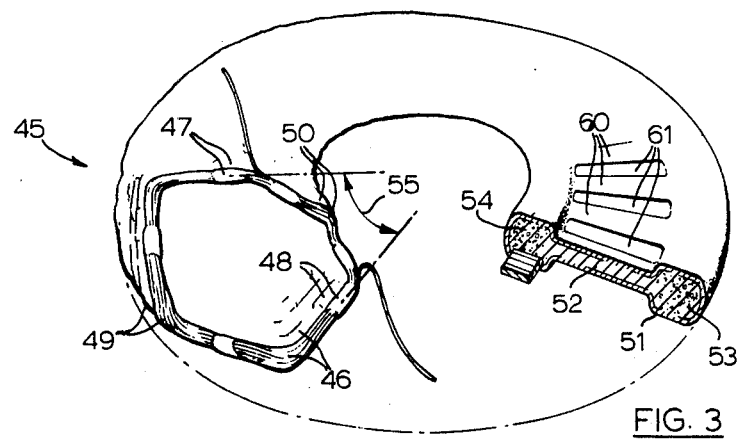
FIG. 3 is a perspective view of a winding structure having a portion broken away to show the coils and the lay thereof.

In FIGS. 1 and 2 there is shown a dynamoelectric machine 10 embodying the invention. This machine is illustrated as a DC machine, and it may be used either as a motor or a generator. However, for purposes of the description to follow the machine will be referred to hereinafter as a motor. Machine 10 consists essentially of a rotor 11 supported for rotation in a stator having housing members 12 and 13, rotor supporting structure 14, brush gear 15, leads 16 and cover 17 for the brush gear.

Housing members 12 and 13 are dish-shaped members made of a magnetic material such as mild steel and serve as the yoke of the magnetic field circuit and provide a substantial portion of the enclosure for the machine. Member 12 has an outer edge portion 18, an open centre defined by the inner edge portion 19, and has the brush gear 15 and cover 17 therefor secured to this inner edge portion by means of a number of bolts 20. Member 13 has an outer edge portion 21, an open centre defined by the inner edge portion 22, and has the bearing retaining member 14 secured to this inner edge portion by means of a number of bolts 23. Members 12 and 13 are secured together at their outer edge portions 18 and 21 by means of a number of bolts 24. The rotor supporting structure includes member 14 and the ball bearings 25 and 26 which are mounted inside the member and carry the shaft 27 of rotor 11. The bearings support the rotor for rotation on its axis 28. Leads 16 provide a circuit for connecting the brushes on gear 15 to a power source.

Rotor 11 resembles a disc wheel. It consists of the following annular portions disposed concentrically about axis 28; a shaft 27; a hub 29 secured to shaft 27; an inner ring portion 30 secured to the hub; a disc portion 31 integral with the inner ring portion; and an outer ring portion 32 integral with the disc portion. Disc portion 31 and ring portions 30 and 32 consists of a plurality of coils nested together in an annular array and bonded together by means of a resinous material, e.g., an epoxy resin, to provide a strong and rigid discoidal rotor structure wherein the electrical conductors of the coils reinforce the resinous mass mechanically. The structure of the rotor and its winding will be described in more detail later. The hub 29 serves as a means for supporting the discoidal structure on the shaft for rotations in a plane normal to axis 28 and also as a fan for circulating a cooling medium counterclockwise around the discoidal structure, the hub having a number of axial fluid flow passages 33 and a number of radially disposed blades 34 for impelling the fluid outwardly. In the machine illustrated, rotor 11 is of the armature, and it has a commutator consisting of an annular array of segments 35 connected to the various coil ends and bonded to the inner ring portion 30 by means of the resin that bonds the coils together. Brush gear 15 carries a number of conductive brushes 36 which bear against the commutator and thereby connect the armature winding to leads 16.

FIG. 1 shows one pair of complementary poles, i.e. one pair of the six pairs of poles provided in the machine shown in FIGS. 1 and 2. Each pair of poles consists of magnetic spacing members 37 and 38 attached to housing members 12 and 13 respectively and permanent magnets 39 and 40 attached to members 37 and 38 respectively, components 37 and 39 being regarded as one pole structure and components 38 and 40 as the other pole structure of the pair. Each pole structure 37, 39 projects from housing member 12 and terminates in a pole face 41 on the magnet, and each pole structure 38, 40 projects from housing member 13 and terminates in a pole face 42 on the magnet. Pole face 41 and 42 are located directly opposite each other on opposite sides of the rotor disc portion with small gaps left between the rotor disc portion and the pole faces. These gaps allow the rotor freedom of rotation betwen the various pairs of poles. Spacers 37 and 38 may be pieces of a mild steel welded to the housing members and the magnets may be bonded to them by means of an epoxy or a methyl-2-cyanoacrylate (Eastman 910) adhesive. In the interest of manufacturing economy, magnets 39 and 40 will usually be flat on both sides and of uniform thickness and the spacers will be shaped to position the magnets for the required pole face spacing and a attitude.

Although in FIG. 1, pole faces 41 and 42 are shown in parallel planes normal to the axis of rotation of the rotor, they need not necessarily be so; the pole faces may lie in planes that are other than normal to axis 28 as shown in the Eric Whitely U.S. application, Ser. No. 534,009 filed Dec. 24, 1974. Pole faces 41, 42 are of opposite magnetic polarity so that the permanent magnets 39, 40 aid in providing magnetic flux in the gap between their faces, i.e., the gap containing the rotor disc. Since spacers 37, 38 and housing members 12, 13 are made of magnetic materials they provide return flux paths.

In very small machines, magnets 39, 40 will probably be single permanent magnet units. However, in the larger machines, each one of the magnets 39 and 40 may be a mosaic of unit permanent magnets of the nature described and claimed in the applicants U.S. application, Ser. No. 502,007 filed Aug. 30, 1974, Eric Whiteley. In FIG. 2 each permanent magnet 40 is shown as a mosaic of two unit magnets 43, 44. Magnets 39 are also mosaics of two units each.

In FIG. 3 there is shown a discoidal winding structure 45 suitable for use in the machine illustrated in FIGS. 1 and 2. This winding structure consists essentially of a plurality of multiple turn oils 46 laid in a flat circular array with the coil sides 47 overlapping sides 48 and the outer and inner end-heads 49 and 50 respectively nested together. The coils are identical, or as nearly identical as it is possible to make them, and their shape is such that mimizie conductors material and yet fit well together in a compact winding. The shape and lay of the coils as they appear during the winding opertion is shown in FIG. 3. Once the coils are in place in the winding, the sides of the coils are formed into the shapes which will be described later and while held in these shapes the entire winding is encapsulated in a resinous material 51, e.g.; an epoxy resin that will flow between the conductors. The resin may be reinforced with glass fibers in selected regions to improve the encapsulated structure. The resulting product is a discoidal winding structure of electrical conductors bonded together by means of a resinous material. This structure is rigid and strong enough to be self supporting under operating conditions. The resin bonded winding structure is in the configuration of an annular disc portion 52 located between enlarged outer and inner ring portions 53, 54 respectively, and the three portions are coaxial. Disc portion 52 is relatively thin and contains the coil sides 47, 48 of coils 46, the sides being radial and at a span 55 of approximately one pole pitch, a pole pitch being the span between two adjacent poles of the machine as indicated at 56 in FIG. 2. Heads 49 on the diverging ends of the sides are located in the outer ring portion 53 and heads 50 on the converging ends of the sides are located in the inner ring portion 54.

According to the invention, cooling of the type of machine decribed above can be improved by forming the rotor with fluid flow interruptions in areas exposed to the cooling fluid in the machine. Formations that serve to disturb laminar fluid flow may take various forms as will now be described with reference to FIGS. 4 to 9.

Figures 4, 5, 6, 7:
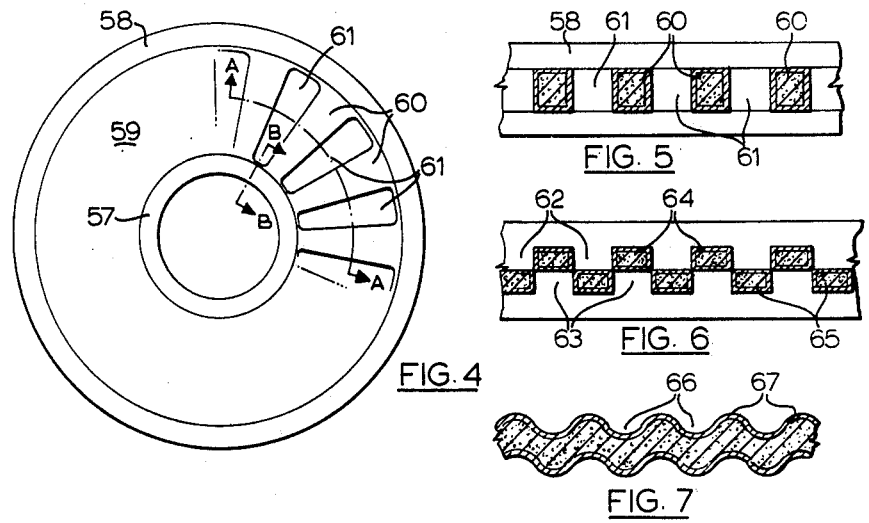
FIG. 4 is an outline of a discoidal rotor.
FIGS. 5, 6 and 7 are cross section views taken on line A—A of FIG. 4 showing different irregularities on the disc portion of the rotor.

FIG. 4 is an outline of the inner and outer ring portions 57, 58 respectively and the intermediate or disc portion 59 of a discoidal rotor constructed according to the foregoing description. In this rotor structure the conductors comprising the coil sides, i.e. the conductors disposed radially between ring portions 57 and 58, are arranged in discrete bundles and the bundles are spaced apart angularly like the spokes of a wheel so that portion 59 is no longer a solid disc, but a disc with apertures in it. The bundles of conductors resembling the spokes of the wheel are shown at 60 in FIG. 4 and 5 and the spaces between them at 61. In the preferred rotor construction, disc portion 59 has a constant axial dimension, in which case the conductor bundles are uniform in cross section throughout their full length and the spaces 61 between them are wedge-shaped, the wedges being widest at the outer ring portion and coming to a point at the inner ring portion. This is best illustrated in FIG. 5.

FIG. 6 shows another way that the conductors may be bundled together into radially disposed formations that increase the surface area of the disc portion of the rotor. In this figure, the surfaces of the disc portion contain grooves 62, 63 alternating with conductor bundles 64, 65 respecively formed into radially disposed ridges. The grooves run in a radial direction, beginning at the inner ring portion and ending at the outer ring portion, They are wedge-shaped, being widest at the outer ring portion and coming to a point at the inner ring portion.

FIG. 7 shows a variation of the ridge and groove formations shown in FIG. 6. In this figure, the alternate grooves 66 and ridges 67 are rounded so as to present a more gradual contour of the disc surfaces. As in FIG. 6, the grooves run radially, are widest at the outer ring portion and come to a point at the inner ring portion.

Figures 8, 9:
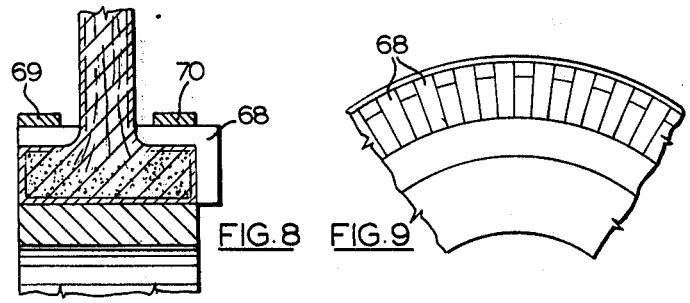
FIG. 8 is a cross section view taken on line B—B of FIG. 4 showing irregularities on the inner ring portion of the rotor.
FIG. 9 is another view of the irregularities shown in FIG. 8.

Because the inner ring portion of the winding structure is the most difficult part of the structure to cool due to its location and size, it may be provided with fins 68 as shown in FIGS. 8 and 9. These fins project outward from the inner ring portion and are formed of a resinous material, preferably formed at the time that the winding is encapsulated, i.e. mould integral with the winding structure. Resin bonded fiber glass bands 69 and 70 may be applied over the fins as shown in FIG. 8 to strengthen the structure mechanically. Fins of this nature may also be provided on the outer ring portion, should the need for them arise.

In the case of FIGS. 1 to 7, where otherwise smooth rotor surfaces are interrupted by formations, the conductors are bundled together as required before the winding is impregnated with the resinous material and the conductor bundles are held in place in a mould while the resin is applied and cured. Once the resin is cured to its solid state, the conductors are locked in place in the bundles and the bundles are locked in place in the winding structure.

In the case of the machine shown in FIG. 1 and 2, rotation of rotor 11 causes impeller 34 (FIG. 1) to drive the cooling fluid inside housing 12, 13 counterclockwise around the winding structure 30, 31, 32. In so doing the fluid comes into contact with the winding structure, the housing, and the field pole structures mounted on the housing. During rotation, the formations of conductors bundles cause turbulence in this flow and in so doing brings more highly moble fluid into contact with an increased surface area. This enchances the transfer of heat from the winding conductors to the fluid so the fluid can now transfer this heat to the housing and the housing to the ambient. Hence cooling of the machine is improved.

What I claim as new and desire to secure by Letters Patent of the United States is:

1. A disc-type, axial gap dynamoelectric machine having a magnetic stator structure; a discoidal rotor; an enclosure for the stator structure and rotor; means for supporting said rotor for rotation in axially spaced, flux linking relation with said stator structure; and a cooling fluid in the spaces between the stator structure and rotor; the electromagnetic portion of said rotor being a rigid, self supporting, resin bonded winding structure consisting essentially of a plurality of coils overlapped in a circular array, interconnected electrically and bonded together with a resinous bonding medium to provide a unitary structure having an annular disc portion containing radially disposed coil sides and coaxial ring portions on the inner and outer edges of the disc portion containing the coil end heads and end conductors; and formations in selected regions of said resinous winding structure interrupting the surface area of the structure exposed to said fluid and thereby enhancing the transfer of heat from the winding conductors to the fluid; said formations comprises discrete bundles of resin bonded conductors disposed radially between said inner and outer ring portions in angular spaced relation so as to resemble spokes of a wheel.

2. The machine of claim 1 wherein said discrete bundles of resin bonded conductors are uniform in cross section throughout their full length.

3. The machine of claim 2 wherein said cooling fluid is air.

4. A disc-type, axial gap dynamoelectric machine having a magnetic stator structure; a discoidal rotor; and enclosure for the stator structure and rotor; means for supporting said rotor for rotation in axially spaced, flux linking relation with said stator structure; and a cooling fluid in the spaces between the stator structure and rotor; the electromagnetic portion of said rotor being a rigid, self supporting, resin bonded winding structure consisting essentially of a plurality of coils overlapped in a circular array, interconnected electrically and bonded together with a resinous bonding medium to provide a unitary structure having an annular disc portion containing radially disposed coil sides and coaxial ring portions on the the inner and outer edges of the disc portion containing the coil end heads and end conductors; and formations in selected regions of said resinous winding structure interrupting the surface area of the structure exposed to said fluid and thereby enhancing the transfer of heat from the winding conductors to the fluid; said formations comprise a wave-like contour on both axial surfaces of said disc portion, the crests and troughs of the waves being disposed radially.

5. The machine of claim 4 wherein said crests and troughs are widest at the outer portion of said disc portion and narrower at the inner portion of said disc portion.

6. A disc-type, axial gap dynamoelectric machine having a magnetic stator structure; a discoidal rotor; an enclosure for the stator structure and rotor; means for supporting said rotor for rotation in axially spaced, flux linking relation with said stator structure; and a cooling fluid in the spaces between the stator structure and rotor; the electromagnetic portion of said rotor being a rigid, self supporting, resin bonded winding structure consisting essentially of a plurality of coils overlapped in a circular array, interconnected electrically and bonded together with a resinous bonding medium to provide a unitary structure having an annular disc portion contaning radially disposed coil sides and coaxial ring portions on the inner and outer edges of the disc portion containing the coil end heads and end conductors; and formations in selected regions of said resinous winding structure interrupting the surface area of the structure exposed to said fluid and thereby enhancing the transfer of heat from the winding conductors to the fluid; said formations comprise radially disposed, angularly spaced ridges of resin bonded conductors on at least one surface of said annular disc portion; said ridges are rectangular in plan form and the depressions between them are triangular in plan form with the apex of the triangle at said inner ring portion.

* * * * *